Dec. 22, 1970        A. A. McRAE        3,548,518
VISUAL GROUND HELICOPTER PILOT TRAINER
Filed April 29, 1968
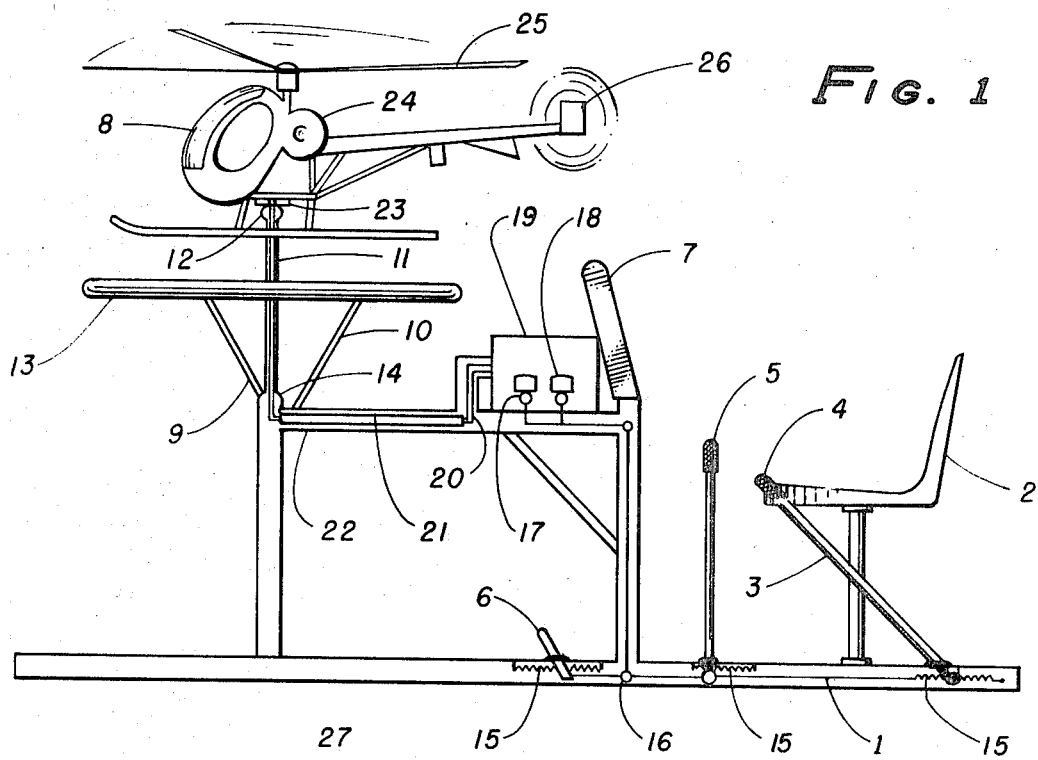
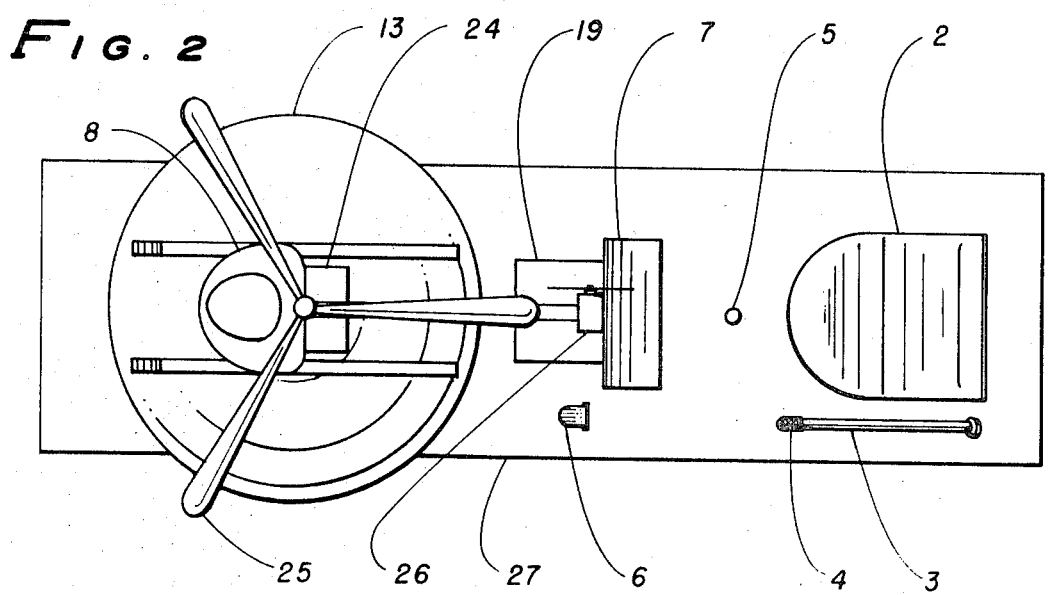
ALLEN A. MCRAE
INVENTOR.

United States Patent Office

3,548,518
Patented Dec. 22, 1970

3,548,518
VISUAL GROUND HELICOPTER PILOT TRAINER
Allen A. McRae, Salem, Oreg.
(18110 Shawnee Trail, Tualatin, Oreg. 97062)
Filed Apr. 29, 1968, Ser. No. 724,972
Int. Cl. G09b 9/08; A63h 27/00
U.S. Cl. 35—12                                      1 Claim

ABSTRACT OF THE DISCLOSURE

A device that aids in the teaching of pilots of helicopters comprising an electrically powered scale model of a helicopter and a student station including a standard set of helicopter flight controls.

---

This invention a Visual Ground Helicopter Pilot Trainer, relates to a mechanical device that aids in the teaching of pilots of helicopters. It is the first to utilize a flying scale model, powered and controlled electrically, with the use of standard flight controls. There are other mechanical training devices that relate to instrument flying and visual flying, but none that utilize a flying scale model of the helicopter itself. The distinct advantage of this invention is that the operator manipulates the same controls, with the same control pressures as he will find in the actual helicopter, and by manipulating these controls in the correct sequence and with the proper coordination, he can see the model helicopter respond in the same fashion as the actual helicopter. The model helicopter will hover, move straight forward, backward, circle right or left, move vertically or any combination of these maneuvers within the range of the tether and the guide ring. This device allows the operator to develop coordination of his hands, arms, feet, and eyes while actually flying the model. The object of this invention is to develop the ability of the student to control an actual helicopter and to see before him the results of his efforts. Crew members are seldom given actual flight training because of the time and expense involved. With this device, the training of these individuals can be accomplished for a nominal amount so that they will have some proficiency in actually flying a helicopter in case of an emergency. It will be used as an amusement device, in schools and colleges as a trainer, and a device to stimulate the general flying business. It should save the armed services time and money in the training of new pilots. Many of the component parts are readily available. Some of them can be purchased used from salvaged helicopters. The flying scale models are very common on sunny days throughout the country. We are herein merely combining known parts into a mechanical device, the combination of which has not been utilized before. The drawing attached (FIG. 1) is an elevation view of the device. FIG. 2 is a plan view of the device. The manner in which the foregoing and other objects of this invention are accomplished will be apparent from the accompanying specification and claim considered together with the drawing attached.

This invention consists of a welded box metal support frame 1 upon which is mounted an adjustable seat 2; a standard set of flight controls which are adaptations from the helicopter itself. Collective control 3 is of one inch aluminum tubing and extends from just above the seat level at the left side of the seat down and into the base where it slides into a sleeve which is attached to the base. The collective lever 3 moves up and down about 15 degrees. A control cable 16 is attached to the collective 3 in the base by means of an arm extending through a slot in the sleeve. Also attached to this arm are springs 15 which extend forward and aft on the inside of the base and are anchored to the base so that the spring tension is adjustable. The control cable 16 extends through the base up and into the junction box 19 where it is attached to the transmitter actuating shaft wheel 17. The twist grip type throttle 4 attached to the upper end of the collective control 3 contains a rheostat that is wired to the junction box 19 and from there through the flex cable 21 to the small electric motor 24 in the model. Electric power is supplied from the junction box 19 to the rheostat. Twist grip type throttle 4 is attached to the upper end of the collective control 3. The cyclic control 5 is also one inch aluminum tubing and is mounted just forward of the seat at the base on a 360-degree swivel arrangement. It also contains the springs 15 with adjustable tension. Control cables are attached to the cyclic control 5 at the base and extend through the base up and into the junction box where they are attached to the transmitter box wheel 17. Transmitter is wired through the flex cable to the solenoid in the model where it actuates the tilt angle of the overhead rotor 6. Rudders are attached to either side of the base just forward of the instrument panel support member by means of a cross bar with pivot in the center. The rudders also have springs attached to the cross bar forward and aft and are adjustable for the proper tension. Control cables are attached to the transmitter shaft wheel. The transmitter is wired through the flex cable and to the solenoid which activates the shaft in the model which increases or decreases the pitch of the tailrotor. The controls on this device will be rigged and will function similar to the control rigging in a helicopter itself. The instrument panel 7 is mounted on a 4-inch aluminum tube that is attached to the base just forward of the cyclic control 5. The top of the panel is just below eye level of the seated operator. It will contain simulated instruments of the actual helicopter as well as the necessary master switch and placard instructions. Forward of the instrument panel 7 is the tethered flying scale model 8 mounted at 9 with a ball joint 10 connected to a tubular metal telescoping shaft 11 which is free to rotate inside the guide ring 13 of tubular metal forming the ring. The guide ring 13 is mounted to the base at 10 and 14. The scale model is free to rotate 360 degrees at the upper and lower ball joints 10. The range of the telescoping shaft restricts the vertical motion of the model and the guide ring 13 restricts the circular range of the telescoping shaft 11. The flight controls 3, 5, and 6 are spring loaded 15 and adjustable to correspond to the control pressures of the actual airborne helicopter. Control cable 16 is attached to the actuating shafts 17 of the electrical control units 18 located in the electrical junction box 19. The junction box 19 contains the actuating circuits, transformers, relays, fuses and lower lead is necessary to operate the device electrically. Electric wires 20 are run from the junction box 19 through a flex cable 21. The flex cable 21 extends through the tubular support frame 22 and continues through the telescoping shaft 11 to the armature type adapter 23 in the scale model 8. The scale model 8 is powered by an electric motor 24 which drives the overhead rotor 25 and the tail rotor 26. The speed of the tail rotor 26 is governed by a gear drive chain within the model. Overhead and tail rotor blades have variable pitch controls that are operated with electrical solenoids. The upper rotor has levers that operate the tilt angle of the blades. The solenoid actuates the levers. The operator by manipulation of the controls can change the speed of the motor 24 by twisting the throttle 4. The collective 3 controls the pitch of the overhead rotor 25, the rudders 6 control the pitch of the rear rotor 26. The cyclic 5 controls the tilt angle of the overhead rotor 25. Overhead rotor blades and tail rotor blades are of rubber construction.

The purpose of this is to avoid injury caused by spectators coming in contact with these moving parts.

The means to mount the scale model consists of a ball and socket joint at 14. The socket attached to the upper end of a steel tube at 14. A telescoping shaft at 11 with the ball at the lower end is inserted into the socket at 14. The telescoping shaft 11 is then able to move within the confines of the guide ring 13. The model has a socket attached at 23. A ball is inserted at the upper end of the telescoping shaft 11 and this ball is inserted into the socket in the model. The ball and socket joints allow the model to move in all directions, limited by the size of the guide ring 13 and the area of the ball and socket joints. The guide ring can be completely detached as the student becomes more proficient, thus allowing more maneuvering room by the model. The model is capable of turning 360 degrees in a horizontal plane, of climbing and descending in a vertical plane, or any combination of these movements within the range limited by the telescoping shaft, the ball joints and the guide ring. Motion in the model is accomplished the same as an actual helicopter i.e.; the forces produced by the overhead rotor and the tail rotor. These lift producing blades are driven by an electrical motor within the model. The model translates in three degrees of freedom, is capable of the following motion, rotation about a vertical axis. This motion is accomplished by a rotatable overhead rotor and a rotatable tail rotor with an electrical motor to drive the rotors. FIGS. 9 and 10 in the drawing are merely the supporting tubular braces for the guide ring. Guide ring 13 restricts the circular range of the telescoping shaft in that the shaft is located inside the ring and as the model is flown in a greater circle, the shaft comes in contact with the ring 13 and it can go no further thus restricting the circling range of the model.

In Hickey, No. 2,711,594, the student pilot does not fly the model by reference to the model itself but rather by a complicated television scanning system with an attachment on his head. Hickey does not simulate control pressures in flight so that you get the same feel of the controls in a trainer that you would in flight. In Hickey, the motion of the model is restricted by the electrical cable 120. In Hickey, an optical system support is adapted to it over the eyes of the student pilot and which would be too cumbersome and artificial. My invention has the student pilot flying the model by merely watching the model react to his efforts with the controls.

Having thus described my invention I claim:

1. A visual ground helicopter pilot trainer comprising a tethered scale model of a helicopter having a rotatable overhead rotor and a rotatable tail rotor, motor means to drive said rotors, a station including control means to simulate helicopter flight controls, means responsive to the operation of said control means to operate said motor means, and means to mount said scale model for rotation about a vertical axis and for translation in three degrees of freedom.

References Cited
UNITED STATES PATENTS

| | | | |
|---|---|---|---|
| 2,711,594 | 6/1955 | Hickey | 35—12 |
| 3,067,528 | 12/1962 | Agusta | 35—12 |
| 3,087,257 | 4/1963 | White | 35—12 |
| 3,204,952 | 9/1965 | Mitchell, Jr. | 35—12 |
| 3,228,119 | 1/1966 | Dornier | 35—12 |

EUGENE R. CAPOZIO, Primary Examiner

P. V. WILLIAMS, Assistant Examiner

U.S. Cl. X.R.

46—78